United States Patent
Whitney et al.

(10) Patent No.: US 7,593,806 B2
(45) Date of Patent: Sep. 22, 2009

(54) SECURED COUNT OF CYLINDERS FUELED IN A COORDINATED TORQUE CONTROL SYSTEM

(75) Inventors: Christopher E. Whitney, Highland, MI (US); Louis A. Avallone, Milford, MI (US); Timothy J. Hartrey, Brighton, MI (US); Mark D. Carr, Fenton, MI (US); Vivek Mehta, Bloomfield Hills, MI (US); Bahram Younessi, Farmington, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/181,410

(22) Filed: Jul. 29, 2008

(65) Prior Publication Data
US 2009/0118985 A1     May 7, 2009

Related U.S. Application Data

(60) Provisional application No. 60/986,134, filed on Nov. 7, 2007.

(51) Int. Cl.
*F02D 41/00* (2006.01)
(52) U.S. Cl. .................................. 701/104
(58) Field of Classification Search ......... 701/103–105, 701/102, 114, 115; 73/118.01; 123/198 F
See application file for complete search history.

(56) References Cited

U.S. PATENT DOCUMENTS 6,925,376 B2 * 8/2005 Li et al. .................... 701/114
7,258,101 B1 * 8/2007 McDonald et al. ......... 123/325

FOREIGN PATENT DOCUMENTS

JP           2007-56712 A  *  3/2007

* cited by examiner

*Primary Examiner*—Hieu T Vo
(74) *Attorney, Agent, or Firm*—Harness, Dickey & Pierce, P.L.C.

(57) ABSTRACT

A control system for a vehicle includes a first counter that indicates a first count of a number of cylinders of an engine of the vehicle that are fueled. A second counter indicates a second count of the number of cylinders that are fueled. A control module determines a secure count based on the first count and the second count. The control module adjusts torque output of the engine based on the secure count.

20 Claims, 7 Drawing Sheets

SECURED COUNT OF CYLINDERS FUELED IN A COORDINATED TORQUE CONTROL SYSTEM

CROSS-REFERENCE TO RELATED APPLICATIONS

This application claims the benefit of U.S. Provisional Application No. 60/986,134, filed on Nov. 7, 2007. The disclosure of the above application is incorporated herein by reference.

FIELD

The present disclosure relates to vehicle control systems and more particularly to engine torque control.

BACKGROUND

The statements in this section merely provide background information related to the present disclosure and may not constitute prior art.

Hybrid powertrains typically include an internal combustion engine (ICE), an electric machine (EM), and one or more torque generators that provide torque to a driveline to propel a vehicle. Two types of hybrid powertrains include a full hybrid powertrain and a mild hybrid powertrain. In a full hybrid powertrain, the EM can drive the drivetrain directly, without transferring torque through a component of the ICE. In a mild hybrid configuration the EM is coupled to the ICE through an accessory drive. Torque generated by the EM is transferred to the drivetrain through the ICE. An exemplary mild hybrid powertrain includes a so-called belt alternator starter (BAS) system. In the BAS system, the EM is coupled to the ICE via a belt and pulley configuration, which drives other accessory components, such as pumps and compressors.

Powertrain torque control typically includes two torque control domains: axle torque and propulsion torque. In a mild hybrid powertrain, the propulsion torque is the output torque at the crankshaft of the ICE, which includes the EM torque contribution.

Powertrain systems also include several torque features. Each of the features affects the amount of drive torque generated at various points along the powertrain system. An upper level or global torque feature refers to a vehicle driver, who commands a desired output torque from torque source(s) or a desired axle torque based on a driver input. Exemplary driver inputs include, but are not limited to, an accelerator pedal and a cruise control system. Modern powertrain systems include additional torque features or torque requests, such as vehicle stability control systems, traction control systems, engine overspeed protection systems, transmission shift quality systems, engine and/or transmission component protection systems, and driveline component protection systems.

The torque features of a particular powertrain system may be independent and can often attempt to control the drive torque during the same time period. Because a powertrain system produces a single drive torque output at an instance in time, an arbitration system is used to determine the correct drive torque output. A control module is typically provided for arbitrating the multiple torque requests and for controlling ICE and EM systems to produce a proper output torque.

SUMMARY

In one embodiment, a control system is provided for a vehicle and includes a first counter that indicates a first count of a number of cylinders of an engine of the vehicle that are fueled. A second counter indicates a second count of the number of cylinders that are fueled. A control module determines a secure count based on the first count and the second count. The control module adjusts torque output of the engine based on the secure count.

In other features, a method of operating a control system of a vehicle is provided and includes generating counter values that each indicate a number of cylinders of an engine of the vehicle that are fueled. A secure count is generated based on the count values. Torque output of the engine is controlled based on the secure count.

In further features, a drivetrain includes an engine that rotates a shaft of the vehicle. An electric machine rotates the shaft. A count module generates counts that each indicate a number of cylinders of the engine that are fueled during a predetermined time period. A control module generates a secure count based on the counts. The control module controls the electric machine and the engine based on the secure count.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
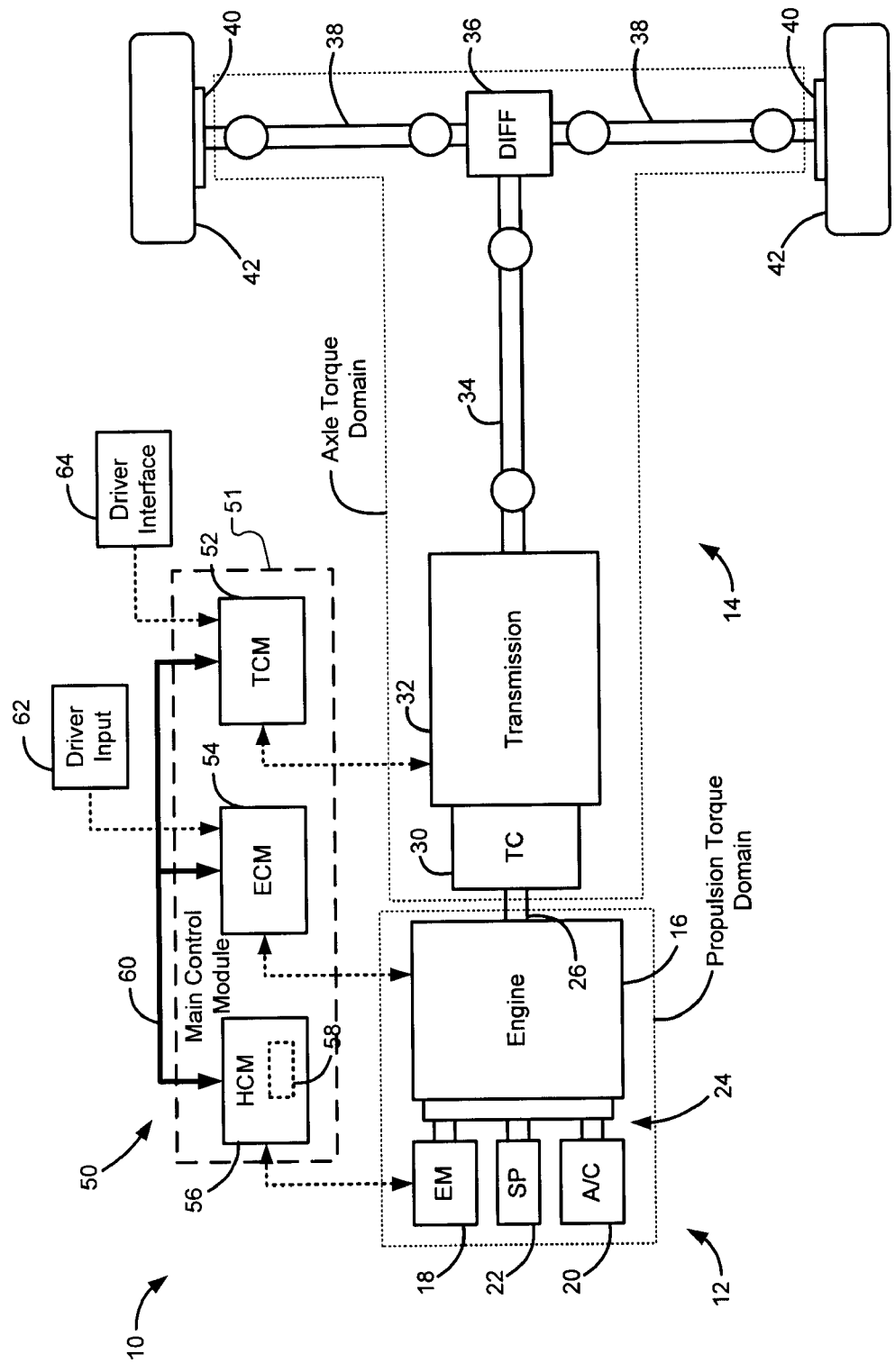
FIG. 1 is an exemplary hybrid powertrain system incorporating control based on a secured count of fueled cylinders.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are continuously repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In the below-described embodiments, cylinder deactivation may refer to the disabling of spark and/or fuel injection into a cylinder. When a cylinder is disabled spark and/or fuel may be disabled for that cylinder. This prevents combustion within that cylinder. The disabling of a cylinder may also or alternatively include retarding spark of a cylinder. Retarding spark may refer to a delay in spark timing from a desired or predetermined point. When retarding spark, spark for a cylinder may occur after top-dead-center (TDC).

In the below-described embodiments the count of cylinders that are being fueled in an engine is secured. A count may be secured by providing redundant and/or additional estimations of the count. For example, multiple indicators of the number of cylinders that are being fueled may be monitored. The indicators may include an indication of how much fuel was delivered to each cylinder at the end of the intake strokes of the cylinders, an indication of the number of cylinders commanded to be fueled, and an indication of injector activation timing and/or duration of injector ON time. The securing of the count indirectly secures spark timing, since spark timing may be based on the count. A method to secure an enabled cylinder count, which may be used in association with disabled cylinders, is to retard spark timing enough to effectively assure that one or more cylinders are disabled. The securing of the count of cylinders fueled aids in securing spark timing.

A count of cylinders enabled may also be secured. Cylinders may not provide the power predicted due to, for example, a plugged injector or a fouled spark plug. The embodiments described herein secure the count of enabled cylinders (cylinders with enabled fuel and spark) to prevent an underestimation of produced torque. Over production of torque can invoke a security risk. By preventing an underestimation of output torque, an over production of electric motor torque is prevented. For example, when an estimation is provided that two cylinders are fueled, but in actuality four cylinders are fueled, spark advance is too advanced and as a result too much torque is produced.

A secure count of fueled cylinders provides an accurate count of the number of fueled cylinders at any instance in time. This provides for improved torque control. When controlling output torque of an engine using cylinder spark control, an accurate count of fueled cylinders and/or disabled cylinders allows a control module to accurately adjust spark levels for enabled/fueled cylinders.

A torque estimate may be used by a hybrid control module to supplement engine output torque. When an estimate of torque output is less than an actual output torque and less than a desired output torque, the control module or associated hybrid system may add torque to supplement the deficiency. This would result in a net output torque increase when a torque increase may not have been needed. For example, when the actual output torque is greater than or equal to the desired output torque, maintenance of or a decrease in output torque should have resulted. An accurate count of fueled cylinders aids in preventing the stated increase in output torque or an unintended increase in acceleration.

Also, when a reserve in torque output is desired, such as when a control module is aware of an upcoming activation in air conditioning. In certain situations a reserve in torque output power that can be quickly accessed and generated is desired. For example, to provide this reserve in torque output power, a throttle may be further opened to increase air flow to an engine while during the same time period spark of enabled cylinders may be retarded. Thus, when a quick increase in output torque is requested, such as when an air conditioning activation event occurs, spark timing may be returned to normal operation. The quick increase in output torque compensates for the increased demand in load due to air conditioning activation. When returning spark to normal operation, spark timing is no longer retarded and spark timing may be adjusted to provide a peak torque output for a given air mass.

Another event that uses a torque reserve is referred to as a catalyst light off. A catalyst light off event refers to the heating of an exhaust catalyst during startup to quickly raise the temperature of the catalyst to an operating temperature for efficient operation. A catalyst light off system uses the torque reserve for torque production purposes. The torque reserve is used to increase airflow and to provide retarded spark, which minimizes hydrocarbon production and produces elevated exhaust gas temperature. This heats a catalytic converter quickly.

When the combination of providing a reserve in output torque and the amount of airflow increase provides a potential output torque that is above a torque security threshold, control (described below) secures spark parameters, such as spark timing and/or spark output levels, used to adjust brake torque. Brake torque of an engine may be increased or decreased based on spark parameters. Since spark parameters may be based on the number of fueled cylinders, a count for the number of fueled cylinders is also secured.

The embodiments disclosed herein provide a secure count of fueled cylinders without increasing hardware devices. Direct and indirect estimates are determined via existing hardware input/output (HWIO) interfaces. Although sensors and/or hardware may be added to directly measure the voltage on each fuel injector of an engine, the embodiments provide the added security without such sensors and/or hardware. This minimizes costs to provide the secured count.

Also, the secured count is accurate and is provided with minimal delay. Should oxygen sensors be used to estimate the cylinder fuel count, there would be a delay time associated. Oxygen sensors are typically located in an exhaust system. Thus, there is a delay from when fuel is combusted in a cylinder to when the gas mixture passes the oxygen sensor. Furthermore, the oxygen sensor provides an indication based on a gross measure associated with exhaust from multiple cylinders. The indication is not cylinder specific. Thus, an estimation based on oxygen sensors can be inaccurate.

At the outset, it is noted that inputs from a driver and/or a cruise control system, discussed in further detail below, are considered true torque requests in the sense that they reflect the amount of torque desired. Other torque modifiers, such as traction control, stability control, engine overspeed protection, transmission torque limiting and the like, are typically considered torque interventions. These torque interventions are in either an active or inactive state. If the torque interventions are either inactive or apply a limit that does not end up limiting a torque request, the torque request will pass through unchanged. For purposes of clarity, the term torque request is used herein for both true torque requests as well as for torque interventions.

Referring now to FIG. 1, an exemplary hybrid powertrain system 10 incorporating control based on a secured count of fueled cylinders is shown. Although the powertrain system 10 is illustrated as a rear wheel drive (RWD) powertrain, it is appreciated that the coordinated torque control of the present disclosure can be implemented with any other powertrain configuration. The powertrain system 10 includes a propulsion system 12 and a drivetrain system 14. The propulsion system 12 includes an internal combustion engine (ICE) 16 and an electric machine (EM) 18. The propulsion system can also include auxiliary components including, but not limited to, an A/C compressor 20 and a steering pump 22. The EM 18 and the auxiliary components are coupled to the ICE 16 using a belt and pulley system 24. The belt and pulley system 24 may be coupled to a crankshaft 26 of the ICE 16 and enable torque to be transferred between the crankshaft 26 and the EM 18 and/or the auxiliary components. This configuration is referred to as a belt alternator starter (BAS) system.

The crankshaft 26 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. A propulsion torque ($T_{PROP}$) that is output at the crankshaft 26 of the ICE 16 is transferred through the drivetrain system components to provide an axle torque ($T_{AXLE}$) at the axle shafts 38 to drive the wheels 42. More specifically, $T_{PROP}$ is multiplied by several gear ratios provided by the coupling device 30, the transmission 32 and the differential 36 to provide $T_{AXLE}$ at the axle shafts 38. Essentially, $T_{PROP}$ is multiplied by an effective gear ratio, which is a function of a ratio introduced by the coupling device 30, a transmission gear ratio determined by transmission input/output shaft speeds, a differential ratio, as well as any other component that may introduce a ratio in the drivetrain system 14 (e.g., a transfer case in a four wheel drive (4WD) or all wheel drive (AWD) powertrain). For the purposes of torque control, the $T_{AXLE}$ domain includes the ICE 16 and the EM 18.

The powertrain 10 also includes a control system 50, which regulates operation of the powertrain 10 based on the coordinated torque control of the present disclosure. The control system 50 includes a main control module 51 that may include a transmission control module (TCM) 52, an engine control module (ECM) 54 and a hybrid control module (HCM) 56. The main control module 51 controls output torque generated via the TCM 52, ECM 54 and HCM 56. The HCM 56 can include one or more sub-modules including, but not limited to, a BAS control processor (BCP) 58. The TCM 52, ECM 54 and HCM 56 communicate with one another via a controller area network (CAN) bus 60. A driver input 62 communicates with the ECM. The driver input 62 can include, but is not limited to, an accelerator pedal and/or a cruise control system. A driver interface 64 communicates with the TCM 52. The driver interface 64 includes, but is not limited to, a transmission range selector (e.g., a PRNDL lever).

The coordinated torque control of the present disclosure includes the axle torque domain and the propulsion torque domain. $T_{PROP}$ is the crankshaft output torque, which may include the EM torque contribution. The coordinated torque control according to the present disclosure implements axle torque ($T_{AXLE}$) arbitration in the ECM to provide an arbitrated axle torque ($T_{AXLEARB}$) and splits the propulsion torque control responsibility to the ECM and the HCM. This split propulsion coordinated torque control facilitates component protection, engine overspeed prevention and system remedial action, among other torque requests, on the ECM. Hybrid propulsion torque control may resume in the HCM where the ECM leaves off and implements regenerative braking, and engine overspeed prevention, among other torque requests.

Advantages of this torque control architecture include the assignment of responsibility for component protection, engine protection and remedial action for failures to the ECM. The TCM issues a torque intervention that may limit the partially arbitrated $T_{PROP}$ from the ECM.

The coordinated torque control of the present disclosure monitors the accelerator pedal position ($\alpha_{PED}$) and the vehicle speed ($V_{VEH}$). A driver intended or desired axle torque ($T_{AXLEDES}$) is determined based on $\alpha_{PED}$ and $V_{VEH}$. For example, $\alpha_{PED}$ and $V_{VEH}$ can be used as inputs to pre-calibrated, pre-stored look-up table, which provides a corresponding $T_{AXLEDES}$. The ECM arbitrates $T_{AXLEDES}$ and other torque requests to provide $T_{AXLEARB}$. The other torque requests include one or more torque requests provided in an axle torque request set. The torque requests are generated by a torque feature and include, but are not limited to, an absolute torque value, a minimum torque limit value, a maximum torque limit value or a delta torque value request. The torque features associated with the axle torque request set include, but are not limited to, a traction control system (TCS), a vehicle stability enhancement system (VSES) and a vehicle overspeed protection system (VOS). Upon determining $T_{AXLEARB}$, $T_{AXLEARB}$ is converted into a propulsion torque ($T_{PROPECM}$) within the ECM using the effective gear ratio. After having determined $T_{PROPECM}$, the ECM arbitrates $T_{PROPECM}$ and a plurality of other propulsion torque requests.

The HCM may issue a torque request indicating a negative or maximum negative torque or zero torque by deactivating the engine cylinders (e.g., by shutting-off the fuel to the cylinders). This can occur during vehicle coast down situations when the accelerator pedal position is zero. For example, the fuel is shut-off and the regenerative braking of the vehicle commences to transfer the kinetic energy of the vehicle into electric power via the EM. To facilitate this, a torque converter clutch that links the wheel torque to the crankshaft is engaged. Through this, the EM is driven.

The TCM provides an arbitrated propulsion torque value ($T_{PROPTCM}$). More specifically, the TCM arbitrates a plurality of torque requests from torque features. An exemplary TCM torque feature is a transmission protection algorithm that generates a maximum torque limit to limit the torque at the transmission input shaft. The maximum torque limit indicates the maximum allowable torque through the transmission input shaft in order to protect transmission components.

The ECM completes the arbitration. Other torque requests include one or more torque requests provided in a propulsion torque request set. The torque requests are each generated by a torque feature and include, but are not limited to, an absolute torque value, a minimum torque limit value, a maximum torque limit value or a delta torque value request. The torque features associated with the propulsion torque request set include, but are not limited to, regenerative braking, engine overspeed protection and EM boost.

The HCM determines $T_{ICE}$ and $T_{EM}$ based on $T_{PROPFINAL}$. More specifically, the HCM includes an optimization algorithm, which partitions $T_{PROPFINAL}$ based on the available torque output of each of the ICE and the EM. $T_{ICE}$ is sent to the ECM, which generates control signals for achieving $T_{ICE}$ using the ICE. The HCM generates control signals based on $T_{EM}$ for achieving $T_{EM}$ using the EM.

Figure 2:
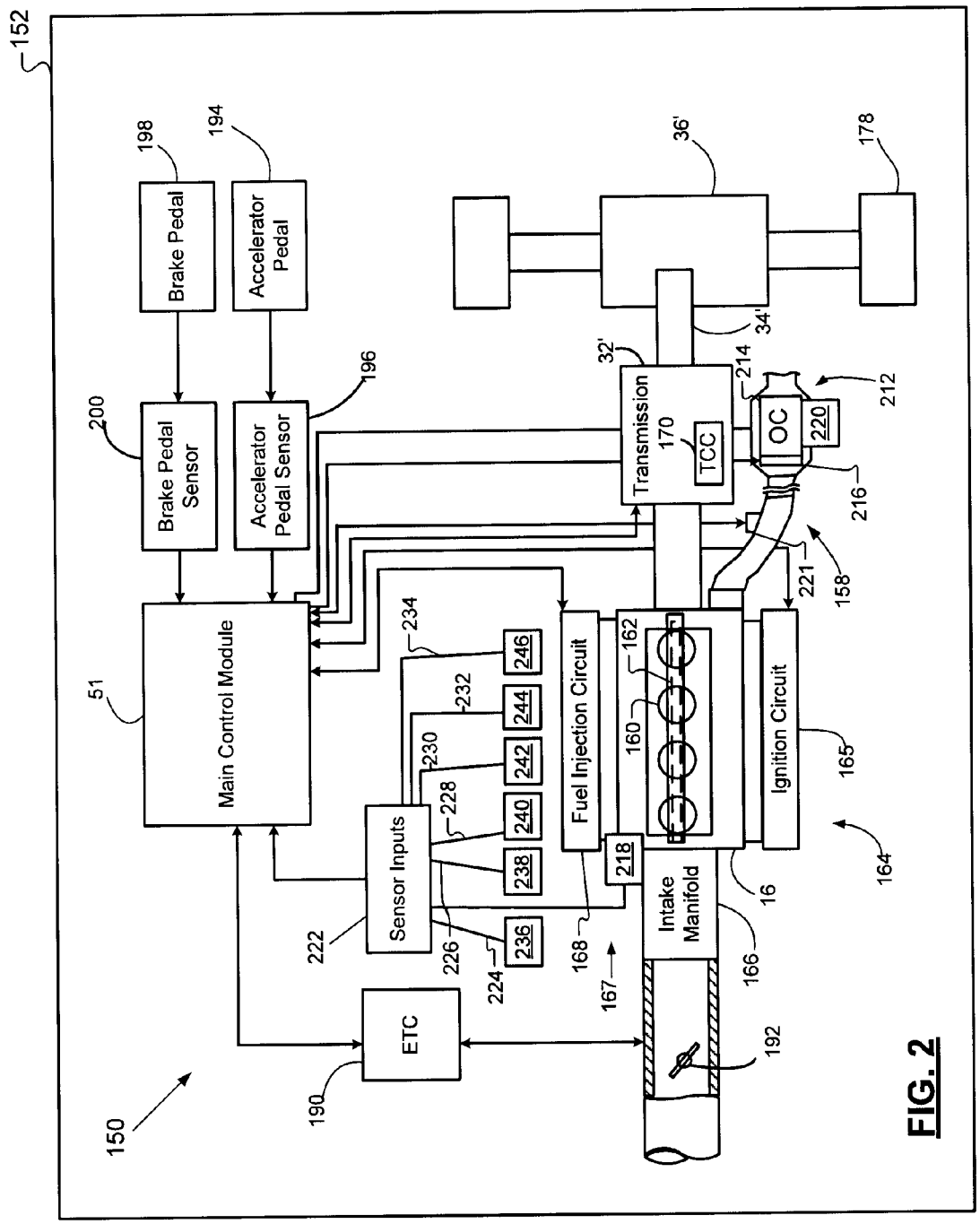
FIG. 2 is a functional block diagram of an exemplary internal combustion engine system incorporating control based on a secured count of fueled cylinders.

Referring now to FIG. 2, a functional block diagram of an ICE system 150 incorporating control based on a secured count of fueled cylinders is shown. The ICE system 150 is on a vehicle 152 and includes the ICE 16 and an exhaust system 158.

The ICE 16 has cylinders 160. Each cylinder 160 may have one or more intake valves and/or exhaust valves. Each cylinder 160 also includes a piston that rides on a crankshaft 162. The ICE 16 may be configured with an ignition system 164 with an ignition circuit 165. The ICE 16 is also configured with a fuel injection system 167 with a fuel injection circuit 168, and the exhaust system 158. The ICE 16 includes an intake manifold 166. The ICE 16 combusts an air and fuel mixture to produce drive torque. The ICE 16, as shown, includes four cylinders in an in-line configuration. Although FIG. 2 depicts four cylinders (N=4), it can be appreciated that the engine 54 may include additional or fewer cylinders. For example, engines having 2, 4, 5, 6, 8, 10, 12 and 16 cylinders are contemplated. It is also anticipated that the fuel injection control of the present invention can be implemented in a V-type or another type of cylinder configuration.

An output of the ICE 16 is coupled by a torque converter 170, a transmission 32', a driveshaft 34' and a differential 36' to driven wheels 178. The transmission 32' may, for example, be a continuously variable transmission (CVT) or a step-gear automatic transmission. The transmission 32' is controlled by the main control module 51.

Air is drawn into the intake manifold 166 via an electronic throttle controller (ETC) 190, or a cable-driven throttle, which adjusts a throttle plate 192 that is located adjacent to an inlet of an intake manifold 166. The adjustment may be based upon a position of an accelerator pedal 194 and a throttle control algorithm that is executed by the control module 51. The throttle 192 adjusts output torque that drives the wheels 178. An accelerator pedal sensor 196 generates a pedal position signal that is output to the control module 51 based on a position of the accelerator pedal 194. A position of a brake pedal 198 is sensed by a brake pedal sensor or switch 200, which generates a brake pedal position signal that is output to the control module 51.

Air is drawn into the cylinders 160 from the intake manifold 166 and is compressed therein. Fuel is injected into cylinders 160 by the fuel injection circuit 168 and spark may be generated by the ignition system 164, when included, to ignite the air/fuel mixtures in the cylinders 160. In diesel applications, the ignition circuit may include glow plugs and/or may not be included. Exhaust gases are exhausted from the cylinders 160 into the exhaust system 158. In some instances, the ICE system 150 can include a turbocharger that uses an exhaust driven turbine to drive a compressor that compresses the air entering the intake manifold 166. The compressed air may pass through an air cooler before entering into the intake manifold 166.

The fuel injection circuit 168 may include fuel injectors that are associated with each of the cylinders 160. A fuel rail provides fuel to each of the fuel injectors after reception from, for example, a fuel pump or reservoir. The control module 51 controls operation of the fuel injectors including the number and timing of fuel injections into each of the cylinders 51 and per combustion cycle thereof. The fuel injection timing may be relative to crankshaft positioning.

The ignition system 164 may include spark plugs or other ignition devices for ignition of the air/fuel mixtures in each of the cylinders 160. The ignition system 164 also may include the control module 51. The control module 51 may, for example, control spark timing relative to crankshaft positioning.

The exhaust system 158 may include exhaust manifolds and/or exhaust conduits and a filter system 212. The exhaust manifolds and conduits direct the exhaust exiting the cylinders 160 into the filter system 212. Optionally, an EGR valve re-circulates a portion of the exhaust back into the intake manifold 166. A portion of the exhaust may be directed into a turbocharger to drive a turbine. The turbine facilitates the compression of the fresh air received from the intake manifold 166. A combined exhaust stream flows from the turbocharger through the filter system 212.

The filter system 212 may include a catalytic converter or an oxidation catalyst (OC) 214 and a heating element 216, as well as a particulate filter, a liquid reductant system and/or other exhaust filtration system devices. The heating element 216 may be used to heat the oxidation catalyst 214 during startup of the ICE 16 and a light off process of the OC 214 and be controlled by the control module 51. The liquid reductant may include urea, ammonia, or some other liquid reductant. Liquid reductant is injected into the exhaust stream to react with NOx to generate water vapor ($H_2O$) and $N_2$ (nitrogen gas).

The ICE system 150 further includes an engine temperature sensor 218, an exhaust temperature sensor 220, and one or more oxygen sensors 221. The engine temperature sensor 218 may detect oil or coolant temperature of the ICE 16 or some other engine temperature. The exhaust temperature sensor 220 may detect temperature of the oxidation catalyst 214 or some other component of the exhaust system 158. The temperatures of the ICE 16 and the exhaust system 158 may be indirectly determined or estimated based on engine and exhaust operating parameters and/or other temperature signals. Alternatively, the temperatures of the ICE 16 and the exhaust system 158 may be determined directly via the engine and exhaust temperature sensors 218, 220.

Other sensor inputs collectively indicated by reference number 222 and used by the control module 51 include an engine speed signal 224, a vehicle speed signal 226, a power supply signal 228, oil pressure signal 230, an engine temperature signal 232, and a cylinder identification signal 234. The sensor input signals 224-234 are respectively generated by engine speed sensor 236, vehicle speed sensor 238, a power supply sensor 240, an oil pressure sensor 242, an engine temperature sensor 244, and cylinder identification sensor 246. Some other sensor inputs may include an intake manifold pressure signal, a throttle position signal, a transmission signal, and manifold air temperature signal.

The control module 51 may modulate torque based upon, for example, a pedal position signal from the pedal position sensor 196 and/or signals from other sensors. The pedal position sensor 196 generates the pedal position signal based upon actuation of the accelerator pedal 194 by a driver. The other sensors may include, for example, a mass air flow (MAF) sensor, a manifold absolute pressure (MAP) sensor, an engine speed sensor, a transmission sensor, and a cruise control system sensor, and/or a traction control system sensor.

Figure 3:
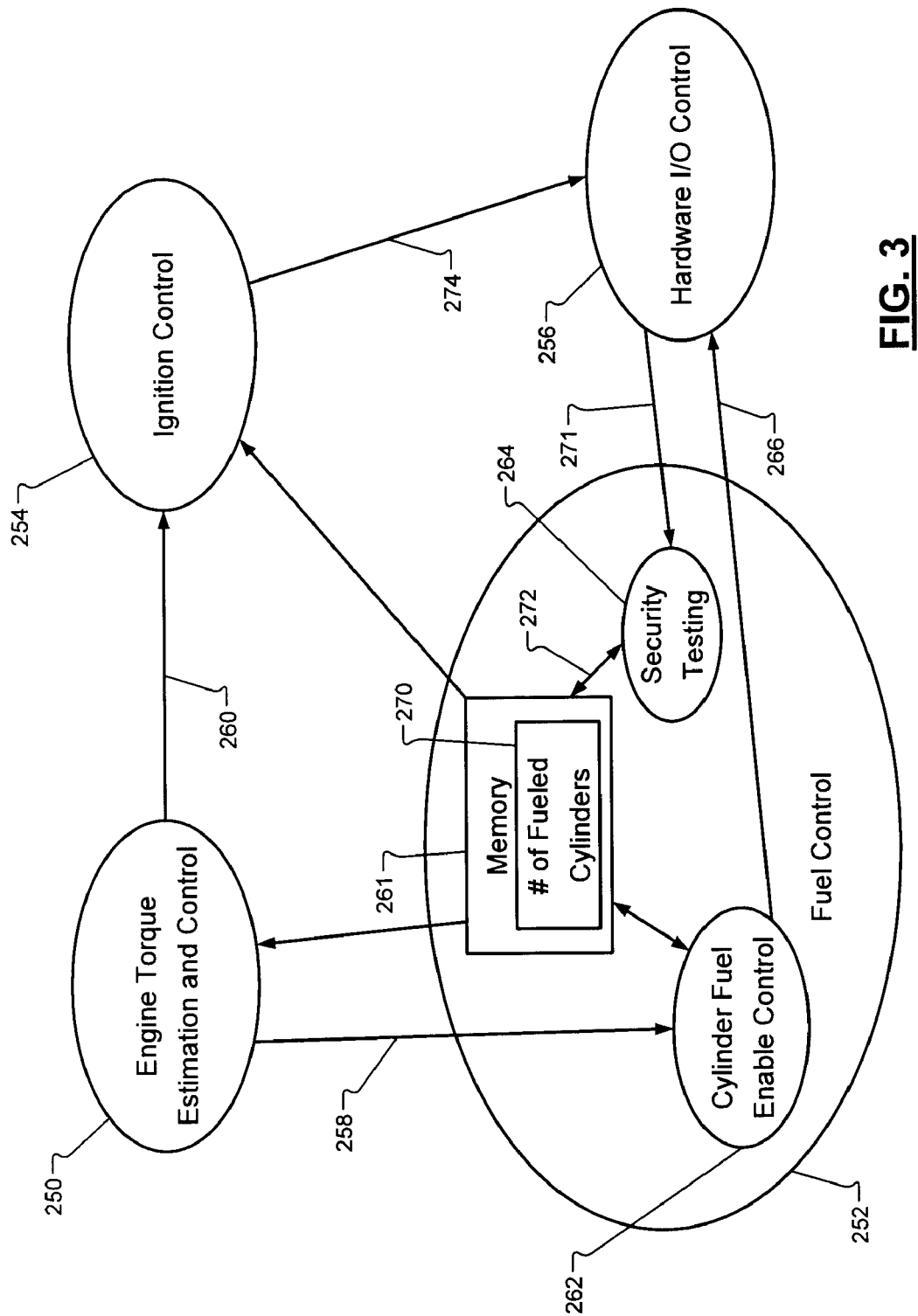
FIG. 3 is a control diagram illustrating control based on a secured count of fueled cylinders.

Referring now to FIG. 3, a control diagram illustrating control of a control system based on a secured count of fueled cylinders is shown. The below described rings and control may be provided by software located in individual independent control modules and/or in a single control module. The control diagram includes an engine torque estimation and control (ETEC) ring 250, a fuel control ring 252, an ignition control ring 254, and a hardware input/output (HWIO) control ring 256. The ETEC ring 250 controls the fuel and ignition control rings 252 and 254 based on inputs received by the HWIO control ring 256. The ETEC ring 250 controls the fuel with little or no input from the ignition control ring 254. However, a spark advance request from the ETEC ring 250 is dependent upon the number of cylinders being fueled. The inputs may include inputs from sensors, some of which are mentioned above. The ETEC ring 250 may generate a fuel control signal 258 and an ignition control signal 260 that are received by the fuel and ignition control rings 252, 254, respectively.

The ETEC ring 250 includes an associated memory 261, a cylinder fuel enable control 262 and security testing 264. The fuel control ring 252 enables fuel for selected cylinders of an ICE, such as the ICE 16, based on the fuel control signal 258 and generates a fuel enablement signal 266. The fuel enablement signal 266 is received by the HWIO control ring, which controls a fuel injection system, such as the fuel injection system 167.

The security testing includes determination and verification of the number of cylinders that are currently enabled and being fueled. Multiple direct and indirect estimates of the number of fueled cylinders are determined. This provides an accurate estimate count of the number of fueled cylinders 270, which is stored in the memory 261. The estimate count may be based on a number cylinders enabled to receive fuel that is stored in the memory 261 by the cylinder fuel enable control ring 262. An example of a direct measure may include a signal generated from the HWIO indicating the number of cylinders being fueled by the HWIO. The signal may be a feedback signal, a signal from a fuel injection system, a fuel injector, a fuel injector or fuel rail sensor, a fuel line sensor, an oxygen sensor, or other vehicle sensor, etc.

An example of an indirect measure may include a fuel mass signal 271 generated by the HWIO that indicates how much fuel was delivered to each cylinder of the engine at the end of the cylinders intake strokes. The amount of fuel delivered indicates whether fuel injection is enabled. Another indirect measure may include a signal generated by the HWIO that indicates duration of injector ON time for each of the cylinders. The duration of injector ON time along with knowledge of, for example, a fuel supply rate of an injector allows for estimation in the mass of fuel delivered. By knowing the mass of fuel delivered to a cylinder, a control module is able to determine whether fuel is enabled for that cylinder.

This testing may also include error and/or failure identification. For example, when one or more of the direct/indirect cylinder fuel count estimates are in conflict with one or more of the other direct/indirect cylinder fuel count estimates measures may be taken. The measures may include commanding the ICE to operate at idle speeds, shutting down the ICE, reducing operating speed of the ICE and/or decelerating the associated vehicle, and generating an indication signal of such conflict. The indication signal may be provided to a vehicle operator, stored in memory, and/or provided to a technician or a local or remote vehicle monitoring system.

The security testing generates a secured count signal 272 with the secured count value 270 that is stored in the memory 261. The ETEC ring 250 and the ignition control ring 254 may receive the secured count and base torque and spark control thereon. The ETEC ring 250 may generate a spark retard or a spark advance signal based on the secured count. The ignition control ring 254 may then control spark based on the spark retard or advance signal. The ignition control ring 254 may also retard spark to a secure level on one or more cylinders to assure disablement of those cylinders and to prevent work output due to the combustion event. The ignition control ring 254 may determine the cylinders that are disabled based on the secured count and further assure disablement by retarding and/or deactivating/disabling spark for the disabled cylinders. In another embodiment, the ETEC ring 250 or other control may selectively determine a number of cylinders and which cylinders to disable and the ignition control system may assure disablement by retarding and/or by disabling spark in the selected cylinders. Similarly the fuel control ring 252 may disable fuel to the selected cylinders based on a command signal from the ETEC 250 and/or the secured count.

The ignition control ring 254 generates a spark enable signal 274, which is received by the HWIO 256. The HWIO enables spark in selected cylinders based on the spark enable signal.

Figure 4:
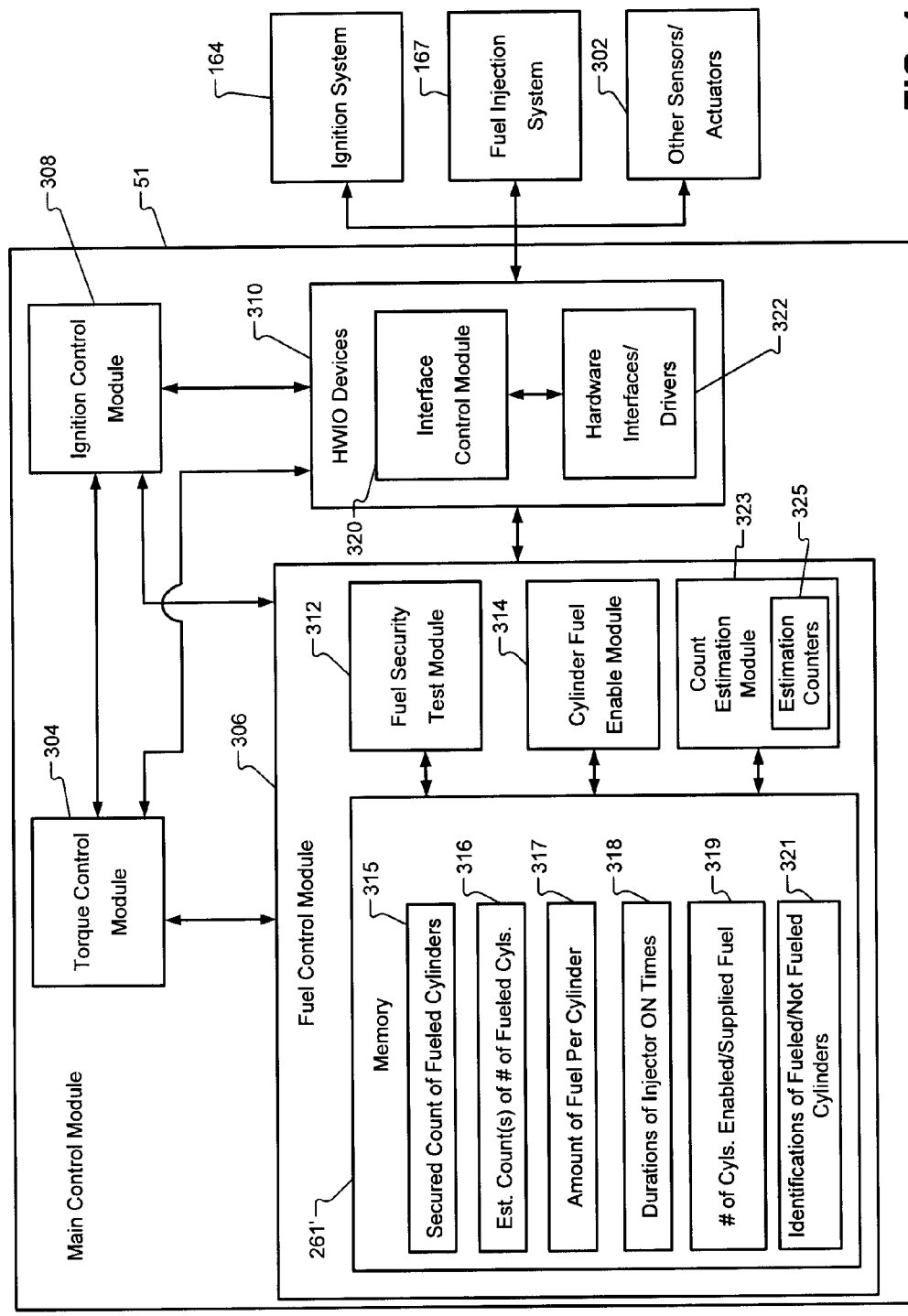
FIG. 4 is a functional block diagram of a secured cylinder fuel count system incorporating control based on a secured count of fueled cylinders.

Referring now also to FIG. 4, a functional block diagram of a secured cylinder fuel count system 300 that includes the main control module 51 is shown. The main control module 51 is in communication with the ignition system 164, the fuel injection system 167 and other sensors and actuators 302. The main control module 51 includes a torque control module 304, a fuel control module 306, an ignition control module 308, and HWIO devices 310. The torque control module 304, a fuel control module 306, an ignition control module 308 and HWIO devices 310 may include the respective control described for the rings 250, 252, 254 and 256 and may include arithmetic logic units.

The fuel control module 306 includes a memory 261', a fuel security test module 312, a cylinder fuel enable module 314, and may include a count estimation module 321. The memory 261' includes various fuel related information associated with fuel enablement for the cylinders of an engine. The fuel related information includes a secured count of fueled cylinders 315, estimated counts (direct and indirect redundant estimations) of fueled cylinders 316, an amount of fuel per each enabled/disabled cylinder 317, durations of fuel injector ON times 318, a number of cylinders enabled/supplied fuel 319, and identifications of the enabled/disabled and/or fueled/not fueled cylinders. The identifications may include a distinction between when a cylinder is commanded to be fueled and whether that cylinder is actually fueled. For example only, a fuel command signal may be generated and provided to a fuel injector or fuel injection system, but a corresponding cylinder of that fuel injector may not actually receive fuel.

The stated counts, estimations, amounts, durations, values may be determined as described in the embodiments disclosed herein and during predetermined periods and/or combustion cycles. For example only, the estimated counts may be provided during the same combustion cycle, consecutive combustion cycles, a predetermined set of combustion cycles, etc.

The fuel security test module 312 and the cylinder fuel enable module 314 may include the respective control described for the cylinder fuel enable control ring 262 and the security testing ring 264. The count estimation module 323 may be part of one of the modules 312, 314 or a separate module as shown. The fuel security test module and/or the estimation module 323 may include one or more estimation counters 323 that determine, count and/or store the estimated count values described herein. The count values may be stored in one of the modules 312, 314, 325 and/or in the memory 261'.

The HWIO devices 310 include an interface control module 320 and hardware interfaces/drivers 322. The interface control module 320 may include the control described for the HWIO control ring 256. The interface control module 320 provides an interface between the fuel control and ignition control software and the hardware interfaces/drivers 322. The hardware interfaces/drivers 322 control operation of, for example, fuel injectors, fuel pumps, ignition coils, spark plugs, throttle valves, solenoids and other torque control devices and actuators. The hardware interface/drivers also receive sensor signals, which are communicated to the respective modules 304, 306 and 308.

Figure 5:
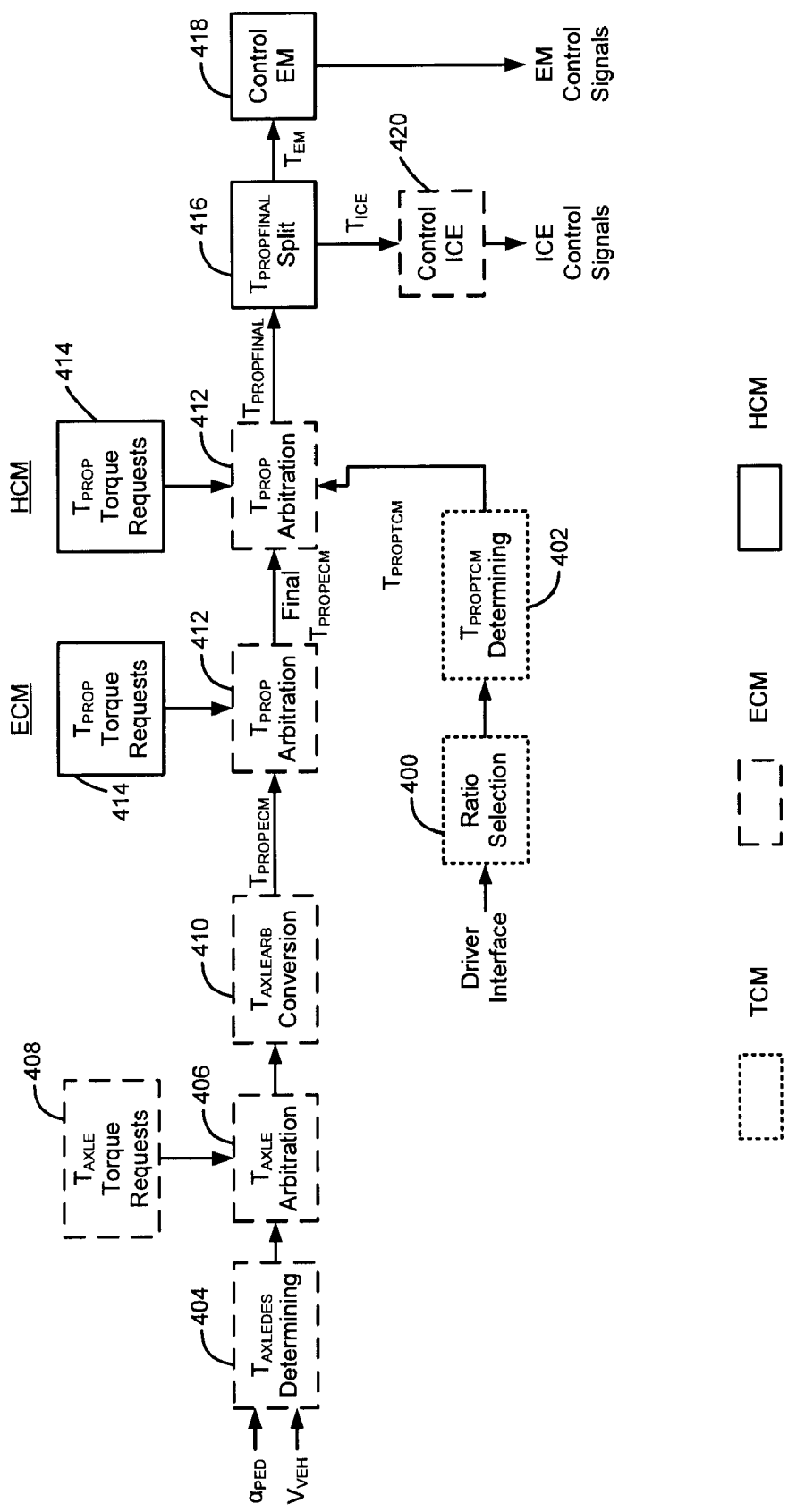
FIG. 5 is a functional block diagram that includes exemplary modules that execute coordinated torque control.

Referring now to FIG. 5, a functional block diagram that includes exemplary modules that execute coordinated torque control are shown. The modules having short-dashed borders are modules that are associated with a TCM. The modules having long-dashed borders are modules that are associated with an ECM. The modules having solid borders are modules that are associated with a HCM. The modules include a ratio selection module 400, a $T_{PROPTCM}$ determining module 402, a $T_{AXLEDES}$ determining module 404, a $T_{AXLE}$ arbitration module 406, a $T_{AXLE}$ torque request module 408, a $T_{AXLEARB}$ conversion module 410, a $T_{PROP}$ arbitration module 412, a $T_{PROP}$ torque request module 414, a $T_{PROPFINAL}$ split module 416, an EM control module 418 and an ICE control module 420.

The ratio selection module 400 receives a signal from a driver interface. The driver interface includes, but is not limited to, a range selector (e.g., a PRNDL lever). The ratio selection module 400 determines a desired gear ratio of the transmission based on the driver interface input and other vehicle operating parameters. The $T_{PROPTCM}$ determining module 402 determines $T_{PROPTCM}$ based on the desired gear ratio provided by the ratio selection module 400. The $T_{AXLEDES}$ determining module 404 determines $T_{AXLEDES}$ based on $\alpha_{PED}$ and $V_{VEH}$. The $T_{AXLE}$ arbitration module 406 arbitrates $T_{AXLEDES}$ along with a plurality of other axle torque requests that are provided by the $T_{AXLE}$ torque request module 408. These other axle torque requests include one or more of the torque requests provided in the above-described first torque request set. The $T_{AXLE}$ arbitration module 406 outputs $T_{AXLEARB}$ to the $T_{AXLEARB}$ conversion module 410. The $T_{AXLEARB}$ conversion module 410 converts $T_{AXLEARB}$ to $T_{PROPECM}$ based on the effective gear ratio of the drivetrain. It is again noted that, after having determined $T_{PROPECM}$, the ECM arbitrates $T_{PROPECM}$ and a plurality of other propulsion torque requests, for which the ECM is responsible.

The final $T_{PROPECM}$, $T_{PROPTCM}$ and other propulsion torque requests are input to the $T_{PROP}$ arbitration module. The other propulsion torque requests are provided by the $T_{PROP}$ torque request module 414 and include one or more of the torque requests provided in the above-described second torque request set. The $T_{PROP}$ arbitration module 412 arbitrates the various propulsion torque requests and outputs $T_{PROPFINAL}$. $T_{PROPFINAL}$ is provided to the $T_{PROPFINAL}$ split module, which proportions $T_{PROPFINAL}$ into $T_{EM}$ (i.e., the propulsion torque to be provided by the EM) and $T_{ICE}$ (i.e., the propulsion torque to be provided by the ICE). $T_{EM}$ is provided to the EM control module 418 and $T_{ICE}$ is provided to the ICE control module 420. The EM control module 418 generates EM control signals to generate $T_{EM}$ using the EM. Similarly, the ICE control module 420 generates ICE control signals to generate $T_{ICE}$ using the ICE.

Figure 6:
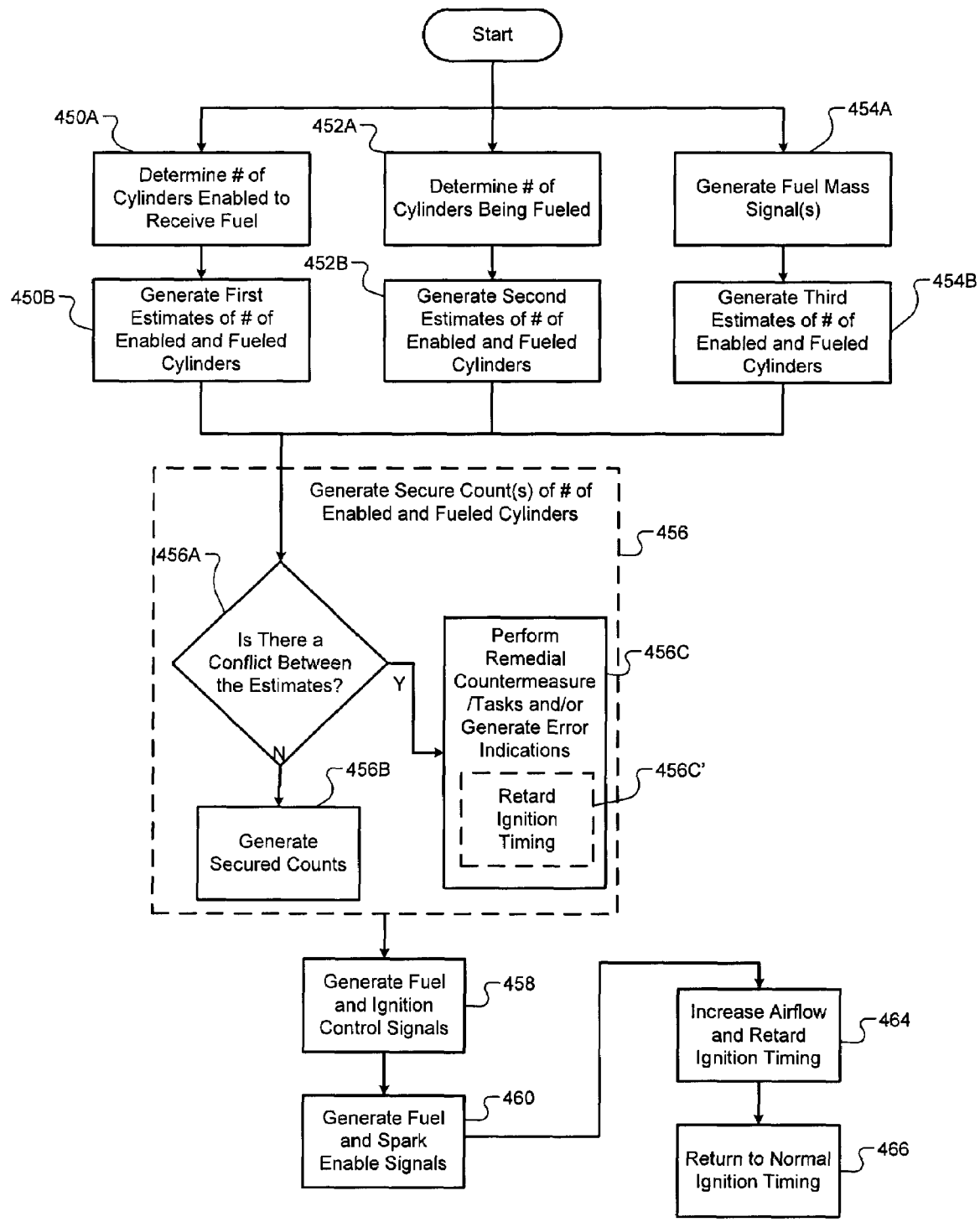
FIG. 6 is a logic flow diagram illustrating a method of performing torque control based on a secured count of fueled cylinders.

Referring now to FIG. 6, a logic flow diagram illustrating a method of performing torque control is shown. Although the following steps are primarily described with respect to the embodiments of FIGS. 3 and 4, the steps may be easily modified to apply to other embodiments of the present invention.

In step 450A, as a first indirect estimate, the HWIO devices 310 and/or the interface control module 320 may also generate an estimate count of the number of cylinders enabled to be fueled. The estimate count may be determined based on stored enable/disable parameters or flags. In step 450B, the interface control module 320 may estimate the number of enabled and fueled cylinders based on the estimated count of step 450A. The fuel control module 306 stores a first cylinders fuel enablement count and a first cylinders fueled count in the memory 261'.

In step 452A, as a first direct estimate, the HWIO devices 310 and/or the interface control module 320 may also generate an estimate count of the number of cylinders currently being fueled. This count may be based on fuel injector control signals generated by the HWIO devices 310 that used to enable respective fuel injectors. In step 452B, the fuel control module 306 stores a second cylinders fuel enablement count and a second cylinders fueled count in the memory 261' based on the fuel injector control signals.

In step 454A, as a second indirect estimate, the HWIO devices 310 and/or the interface control module 320 determines an amount of fuel delivered to each cylinder of an engine. The interface control module 320 may determine the amount based on duration ON time of each fuel injector of a cylinder. The HWIO devices 310 and/or the interface control module 320 may generate fuel mass signal(s) to indicate the amounts. In addition or as an alternative, the HWIO devices 310 and/or the interface control module 320 may also generate fuel injector duration ON time signal(s).

In step 454B, the fuel control module 306 may estimate the number of cylinders enabled and/or being currently fueled based on the fuel mass signal(s). The fuel control module 306 may determine whether a cylinder was enabled and fueled during its last intake stroke based on the corresponding fuel mass signal. This information may be loaded into an array at the end of each intake stroke. The information accumulated in the array for each of the cylinders may then be summed up to determine the total number of cylinders being fueled. The estimates are stored as a third cylinders fuel enablement count and a third cylinders fueled count in the memory 261'.

In addition or alternatively, the fuel control module 306 may estimate the number of cylinders enabled and/or being currently fueled based on the duration ON time signal(s). The estimates are stored as a third cylinders fuel enablement count and a third cylinders fueled count in the memory 261'.

In step 456, the fuel control module 306 may determine and verify the number of cylinders enabled and/or currently being fueled. This verification may be reported as a secure count or secured counts and stored in the memory 261'. In step 456A, the fuel control module 306 compares the estimates of steps 450-454. For example, the fuel control module 306 may compare the indirect estimates in steps 450 and 454 with the direct estimate in step 452. When the comparison reveals that the indirect estimates are the same as the direct estimates control proceeds to step 456B, otherwise to step 456C. In step 456B, the secured counts are generated and stored for torque control and estimation.

In step 456C, an error is detected. The error may be reported to the torque control module 304 and/or the main control module 51, which may provide such indication to a vehicle operator. When the indirect estimates are less than the direct estimate or vice versa, then there may be more cylinders being fueled then estimated. To assure that there are the same number of disabled cylinders as desired, control may retard spark and/or disable spark to disabled cylinders, as generally indicated by step 456C'. The torque control module 304 and/or the main vehicle control module may perform tasks, such as commanding an ICE to operate at idle speeds, shutting down the ICE, reducing operating speed of the ICE and/or decelerating the associated vehicle.

In step 458, the torque control module 304 may generate fuel and ignition control signals based on the secured count of step 456B. The torque control module 304 may use the secured count to scale the indicated output torque by the cylinders being fueled. In torque control of spark the number of cylinders disabled is determined based on the secured count to determine the spark level for remaining cylinders. In one embodiment, the main control module 51 may generate a reserve power signal. The reserve power signal may be associated with a predicted increased load event, such as activation of air conditioning or catalyst light off. The torque control module 304 may use the secured count to scale the indicated output torque by the cylinders being fueled for the increased load event.

In step 460, the fuel and ignition control modules 306 and 308 may generate fuel enable and spark enable signals based on the fuel and ignition control signals. Output torque of the engine may be increased, decreased or supplemented based on the secure count. The output torque may be supplemented by an electric machine, such as that described herein. An electric machine may also be used to brake the engine based on the secure count.

In step 464, the main control module 51 and/or the torque control module 304 may increase airflow to the engine by adjusting throttle position based on the reserve power signal, the secured count, and/or a torque threshold. The torque control module 304 and/or the ignition control module 308 may retard spark in one or more of the cylinders based on the reserve power signal and/or the secured count.

In step 466, when the increased load event is initiated, the torque control module 304 and/or the ignition control module 308 may refrain from retarding spark in the cylinders to quickly increase output torque of the engine. The ignition timing may return to normal operation while maintaining increased airflow. The ignition timing may be set to provide a maximum output torque. Spark may be adjusted to TDC or to a time after TDC. The retarding of ignition timing may be performed in addition to determining the secured count or alternatively to determining the secured count. For example, in diesel applications secured count of fueled cylinders may be used. On the other hand, in spark ignition engines both a secured count of fueled cylinders and ignition retardation may be used to assure disablement of selected cylinders.

The above-described steps are meant to be illustrative examples; the steps may be performed sequentially, synchronously, simultaneously, continuously, during overlapping time periods or in a different order depending upon the application. As an example, steps 450A, 450B may be performed during the same time period or combustion cycle as steps 452A, 452B and/or steps 454A, 454B.

Figure 7:
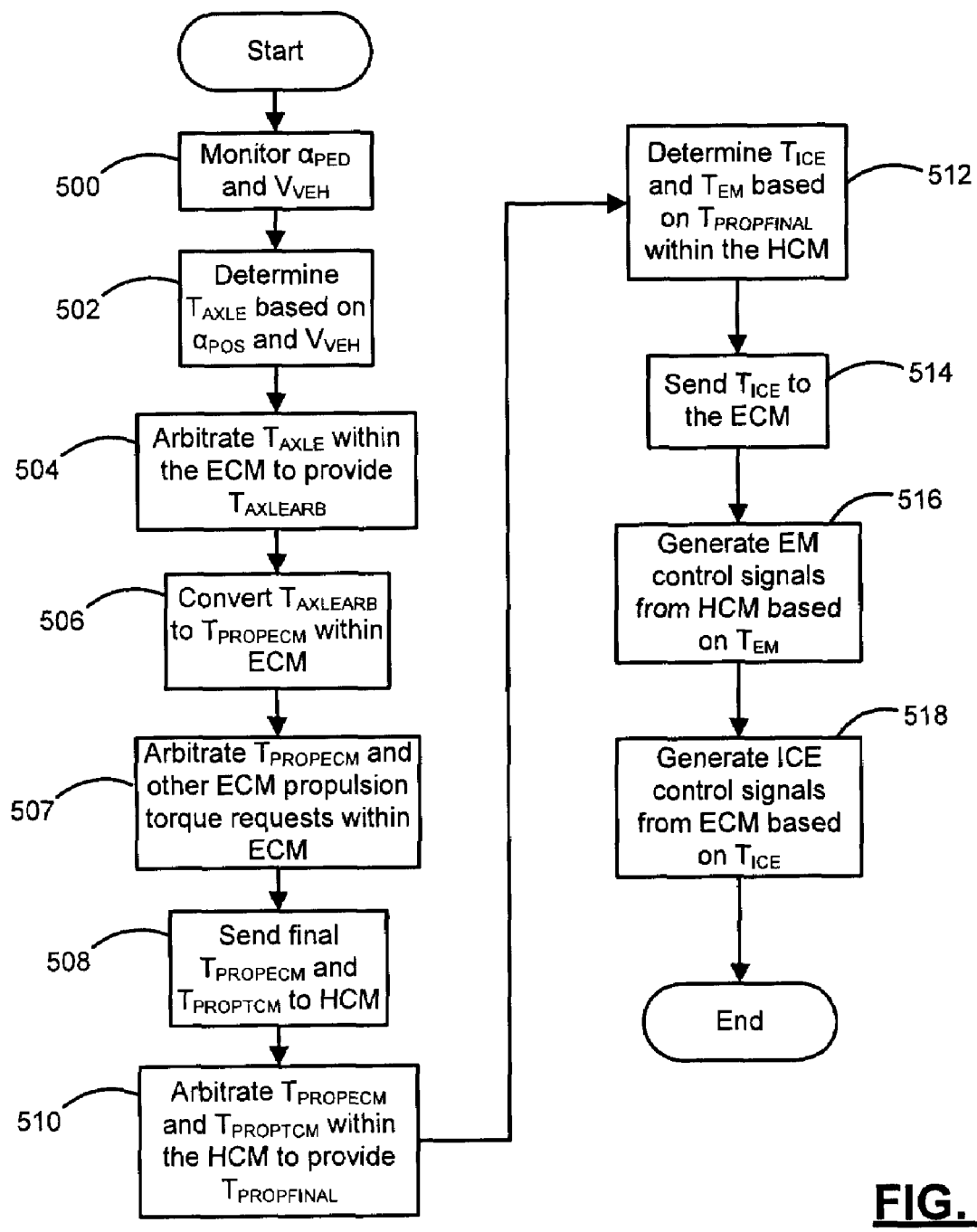
FIG. 7 is a flow diagram illustrating exemplary steps that may be executed during coordinated torque control.

Referring now to FIG. 7, a flow diagram illustrating exemplary steps that may be executed during coordinated torque control is shown. One or more of the following steps may be performed based on a secured count of fueled cylinders. In step 500, control monitors $\alpha_{PED}$ and $V_{VEH}$. Control determines $T_{AXLEDES}$ based on $\alpha_{PED}$ and $V_{VEH}$ in step 502. In step 504, control arbitrates $T_{AXLEDES}$ and other torque requests within the ECM to provide $T_{AXLEARB}$. The other torque requests include one or more of the torque requests provided in the above-described first torque request set. Control converts $T_{AXLEARB}$ into $T_{PROPECM}$ within the ECM using the effective gear ratio in step 506. It is again noted that, after having determined $T_{PROPECM}$, the ECM arbitrates $T_{PROPECM}$ and a plurality of other propulsion torque requests, for which the ECM is responsible, in step 507 to provide a final $T_{PROPECM}$ to the HCM.

In step 508, control sends both the final $T_{PROPECM}$ from the ECM and $T_{PROPTCM}$ from the TCM to the HCM. In step 510, control arbitrates $T_{PROPECM}$, $T_{PROPECM}$ and other torque requests within the HCM to provide $T_{PROPFINAL}$. The other torque requests include one or more of the torque requests provided in the above-described second torque request set. Control determines $T_{ICE}$ and $T_{EM}$ based on $T_{PROPFINAL}$ within the HCM in step 512. In step 514, control sends $T_{ICE}$ to the ECM. Control generates EM control signals from the HCM based on $T_{EM}$ in step 516. In step 518, control generates ICE control signals from the ECM based on $T_{ICE}$ and control ends.

The embodiments disclosed herein provide security for the count of cylinders being fueled without additional hardware added to HWIO. The embodiments provide the count security via available HWIO information. The embodiments also include two different independent actuators, fuel and spark, to assure disablement of a cylinder and to assure that a cylinder is not generating power.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system for a vehicle comprising:
a first counter that indicates a first count of a number of cylinders of an engine of the vehicle that are fueled;
a second counter that indicates a second count of said number of cylinders that are fueled; and
a control module that determines a secure count based on said first count and said second count,
wherein said control module adjusts torque output of said engine based on said secure count.

2. The control system of claim 1 wherein said first counter and said second counter estimate said first count and said second count based on a number of cylinders of said engine that are not being fueled.

3. The control system of claim 1 wherein said first counter and said second counter estimate said first count and said second count based on a number of cylinders of said engine that are disabled.

4. The control system of claim 1 wherein said first count is estimated differently than said second count.

5. The control system of claim 1 wherein said first count is a direct estimate of said number of cylinders and said second count is an indirect estimate of said number of cylinders.

6. The control system of claim 1 wherein at least one of said first counter and said second counter estimate said first count and said second count based on a received signal from a fuel injection system.

7. The control system of claim 1 wherein at least one of said first counter and said second counter estimate said first count and said second count based on a number of enabled cylinders.

8. The control system of claim 1 wherein at least one of said first counter and said second counter estimate said first count and said second count based on mass of fuel delivered to cylinders of said engine.

9. The control system of claim 8 wherein said mass is determined based on at least one of duration of injector ON time and fuel supply rate of said cylinders.

10. The control system of claim 1 wherein said control module at least one of operates said engine at an idle speed, shuts down said engine, and reduces speed of said engine when said first count is different than said second count.

11. The control system of claim 1 wherein said control module at least one of disables and retards spark to cylinders of said engine that are not fueled based on said secure count.

12. The control system of claim 11 wherein said control module at least one of disables and retards spark to cylinders of said engine that are not fueled based identifications of said cylinders that are fueled.

13. A drivetrain comprising:
an engine that rotates a shaft of the vehicle;
an electric machine that rotates said shaft;
a count module that generates a plurality of counts that each indicate a number of cylinders of said engine that are fueled during a predetermined time period; and
a control module that generates a secure count based on said plurality of counts,
wherein said control module controls said electric machine and said engine based on said secure count.

14. The method of claim 13 wherein said count module indirectly estimates said plurality of counts based on mass of fuel supplied to each of said cylinders.

15. The method of claim 13 wherein said control module increases speed of said engine based on said secure count.

16. A method of operating a control system of a vehicle comprising:
generating a plurality of counter values that each indicate a number of cylinders of an engine of the vehicle that are fueled;
generating a secure count based on said plurality of counter values; and
controlling torque output of said engine based on said secure count.

17. The method of claim 16 wherein said plurality of counter values comprise a first count and a second count, and wherein said first count is determined differently than said second count.

18. The method of claim 17 wherein said first count is determined based on duration ON time of fuel injectors of said engine, and
wherein said second count is determined based on fuel supply rate of cylinders of said engine.

19. The method of claim 13 further comprising at least one of disabling and retarding spark of a cylinder of said engine based on said secure count.

20. The method of claim 13 further comprising adjusting engine torque output with an electric machine based on said secure count.

* * * * *